US012706255B2

(12) United States Patent
Schroeder et al.

(10) Patent No.: US 12,706,255 B2
(45) Date of Patent: Aug. 11, 2026

(54) SWITCHING DEVICE AND METHOD FOR OPERATING A SWITCHING DEVICE

(71) Applicant: Eaton Intelligent Power Limited, Dublin (IE)

(72) Inventors: Kai Schroeder, Bonn (DE); Lutz Friedrichsen, Langerwehe (DE); Gabriel Wiedera, Bonn (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 183 days.

(21) Appl. No.: 18/563,104

(22) PCT Filed: May 26, 2022

(86) PCT No.: PCT/EP2022/025247

§ 371 (c)(1),
(2) Date: Nov. 21, 2023

(87) PCT Pub. No.: WO2022/248081

PCT Pub. Date: Dec. 1, 2022

(65) Prior Publication Data

US 2024/0222039 A1 Jul. 4, 2024

(30) Foreign Application Priority Data

May 27, 2021 (GB) ..................................... 2107592

(51) Int. Cl.

| | |
|---|---|
| ***H01H 1/20*** | (2006.01) |
| ***H01H 1/50*** | (2006.01) |
| ***H01H 50/58*** | (2006.01) |
| ***H01H 73/04*** | (2006.01) |

(52) U.S. Cl.
CPC ............ *H01H 1/2008* (2013.01); *H01H 1/50* (2013.01); *H01H 50/58* (2013.01); *H01H 73/045* (2013.01)

(58) Field of Classification Search
CPC ...... H01H 1/2008; H01H 1/2075; H01H 1/50; H01H 3/60; H01H 50/58; H01H 73/045; H01H 1/20; H01H 1/2016; H01H 1/2025; H01H 1/502; H01H 50/56; H01H 73/00; H01H 73/04
USPC .......................................................... 200/238
See application file for complete search history.

(56) References Cited

U.S. PATENT DOCUMENTS 3,942,143 A * 3/1976 Pollmann ............. H01H 50/541 335/132
2019/0189366 A1 6/2019 Perrin

FOREIGN PATENT DOCUMENTS

| | | | |
|---|---|---|---|
| CN | 112331526 | A | 2/2021 |
| EP | 0827174 | A1 | 3/1998 |
| EP | 2381460 | A1 | 10/2011 |
| WO | 2020035489 | A1 | 2/2020 |

(Continued)

*Primary Examiner* — Anthony R Jimenez
(74) *Attorney, Agent, or Firm* — LEYDIG, VOIT & MAYER, LTD.

(57) ABSTRACT

A switching device comprises a first and a second fixed contact, a contact bridge, a first and a second movable contact arranged at the contact bridge, at least one contact spring, a contact bridge carrier which is movable and is coupled to the contact bridge via the at least one contact spring and a lever arm connected to the contact bridge or the contact bridge carrier and configured to slow down a movement of the contact bridge relative to the contact bridge carrier in case of a short circuit.

13 Claims, 8 Drawing Sheets

(56) References Cited

FOREIGN PATENT DOCUMENTS

WO 2020/126976 A1 6/2020

* cited by examiner

SWITCHING DEVICE AND METHOD FOR OPERATING A SWITCHING DEVICE

CROSS REFERENCE TO RELATED APPLICATION

This application is a national phase filing under 35 C.F.R. § 371 of and claims priority to PCT Application No. PCT/EP2022/025247, filed on Nov. 21, 2023, and claims the priority benefit under 35 U.S.C. § 119 of British Patent Application No. GB 2107592.4, filed on May 27, 2021.

FIELD

The present disclosure is related to a switching device and a method for operating a switching device.

The switching device is realized as an electromechanical switching device, e.g., for conducting and switching bidirectional DC currents, especially for a high-power battery network in the field of electro-mobility.

BACKGROUND

A combination of contactor/relay for conducting and switching in regular operation and separate fuse elements for rapid disconnection in emergency situations, such as in case of a short circuit, is generally used for current conduction and safe isolation of an energy supply between an energy storage device and a DC grid. This combination is applied to so-called high-voltage on-board networks in the field of electro-mobility with nominal voltages of several hundred volts and DC currents that can be larger than 100 A in operation. In such applications, currents of several kilo amperes can occur in case of a short circuit, combined with the formation of DC arcs which can lead to considerable destruction within a few milliseconds without a suitable protective device.

Document WO 2020035489 describes a switching device for carrying and disconnecting bidirectional DC currents, suitable for high-voltage networks in electric vehicles. DC currents of several hundred amperes can occur in a charging mode for rapid charging of energy storage units in larger electric vehicles. In driving operation, the power electronics of the vehicle ensures that the currents to be switched are limited to approximately 30 amperes so that the switching device enables a long electrical service life of over 100,000 switching operations under load.

If, on the other hand, a short circuit occurs in the DC network, which in case of powerful electric vehicles with a fully charged energy storage system can amount to several kilo amperes, then the switching device ensures, by very quickly opening the switching contacts that the resulting switching arcs are always quickly moved away from the contacts in the direction of arcing chambers by magnetic blowing field forces, irrespective of the direction of current flow, and are extinguished there so that the short circuit current is safely switched off within a few milliseconds.

A short circuit is detected by a current sensor element, for example in the form of a Hall sensor, which is located in the immediate vicinity of one of the contact terminals. When a predetermined threshold value is exceeded by the current, the coil voltage of the electromagnetic switching drive is immediately switched off by the electronic control unit of the switching device in such a way that the switching contacts open within a time of less than 2 milliseconds and remain permanently open. In case of a short circuit, on the one hand, very fast disconnection is of particular importance in order to avoid short circuit damage, and on the other hand, unintentional re-contacting of the switching contacts should be avoided due to the dynamic forces acting in the switching device in case of a short circuit, with the aim of ensuring safe galvanic isolation of the current source and DC mains even in case of a short circuit, as well as enabling safe reconnection after rectification of the cause of the short circuit.

However, if the short circuit energy is very high, the dynamic forces of the short circuit current may cause the switching contacts to open even before the switching actuator starts the regular mechanical opening process via a de-current signal induced by the current sensor. The contact spring of the switching actuator, which is still mechanically closed, experiences additional compression due to the dynamic current forces of the short circuit. At the same time, high-energy arcs are immediately formed between the opening switching contacts, which remain there due to the initially small contact distance and are only set in motion by the mechanical opening process of the switch drive under the effect of the magnetic blowing field forces in the direction of the arcing chambers with increasing contact distance and are extinguished there.

In case of high short circuit currents, the moving parts of the opening switching device experience an additional impulse due to the current forces, which results in an increased rebound of the contact bridge when it reaches its mechanical end stop. In this process, with the beginning of the mechanical opening process of the switch actuator, the contact spring also relaxes with its compression increased by the short circuit current forces in such a way that the movable contact bridge thereby experiences a further impulse in the closing direction. Due to these dynamic conditions, high short circuit currents can result in unintentional re-contacting of the switching contacts, which means that galvanic isolation of the current source and the DC network no longer exists. The high arc energy of the short circuit arcs, which are still stationary during the opening process, can lead to melting of the contact surfaces, which in case of re-contacting can also cause permanent welding of the switching contacts.

Document CN112331526 A discloses a ratchet bar type damping return self-locking on-off switch mechanical arm which comprises a shell, an electromagnetic driving assembly, a lifting frame, two locking swing arms, two one-way piston type dampers, a static insulating plate and a movable insulating plate. The shell is provided with a ratchet bar. The position of the moving contact is locked so that the moving contact and the static contact are kept in good contact and a continuous electrification is not needed. Prongs at the sidewalls are mechanically shaped so that a movement of the moving plate towards the static plate can be done easily. A movement of the moving plate away from the static plate is only possible in case the locking swing arms are completely removed from the prongs.

Document WO 2020/126976 A1 refers to a switching device for guiding and switching of load currents. The switching device comprises a movable switching component realizing a contact bridge and having a first and a second movable contact. The switching device further comprises a first and a second fixed contact and a supporting device to support the switching component. In a switched-on state of the switching component, the first movable contact is in contact with the first fixed con-tact, and the second movable contact is in contact with the second fixed contact. Furthermore, in a switched-off state of the switching component, the first movable contact is electrically separated from the first fixed contact, and the second movable contact is electrically separated from the second fixed contact. The switching component is arranged such that the switching component is moved between the switched-on state and the switched-off state by a rotational movement of the switching component and a translational movement of the supporting device.

Document EP2381460 A describes an installation device with a double interruption. A contact bridge is fixed to a contact bridge carrier. An absorption member is arranged so that the absorption member slows down a movement of the contact bridge. The absorption member comprises a piece of material made of an elastic material. The contact bridge carrier or the contact bridge itself hits the absorption member.

SUMMARY

The present disclosure provides a switching device and a method for operating a switching device that reduces the probability for an unintentional re-contacting of the switching contacts.

The definitions as described above also apply to the following description unless otherwise stated.

There is provided a switching device comprising a first and a second fixed contact, a contact bridge, a first and a second movable contact arranged at the contact bridge, at least one contact spring, a contact bridge carrier and a lever arm. The contact bridge carrier is movable and is coupled to the contact bridge via the at least one contact spring. The lever arm is connected to the contact bridge or the contact bridge carrier and is configured to slow down a movement of the contact bridge relative to the contact bridge carrier in case of a short circuit.

Advantageously, the lever arm obtains the function of a brake of the movement of the contact bridge. By reducing the kinetic energy of the contact bridge during forced contact bridge opening induced by high energy short circuit arcs, the probability of re-connecting is reduced.

In an embodiment, the switching device is configured that a current flowing in case of a short circuit through the first fixed contact, the first movable contact, the contact bridge, the second movable contact and the second fixed contact causes the movement of the contact bridge relative to the contact bridge carrier in case of a short circuit.

In an embodiment, the switching device comprises a magnetic drive assembly with an electric coil and an armature. The armature is movable and is directly coupled to the contact bridge carrier.

In an embodiment, the switching device is configured that the movement of the contact bridge relative to the contact bridge carrier in case of a short circuit starts before the armature starts to move.

In an embodiment of the switching device, the lever arm is configured to be bended towards a contacting area in case of a short circuit such that a frictional force occurs between a tip of the lever arm and the contacting area. For example, the contacting area is opposite of the lever arm, e.g., opposite of the tip of the lever arm.

In an embodiment of the switching device, the contacting area has at least one of a rough surface, a toothed structure, a groove-like structure, a ribbed structure and a surface made of rubber or a rubber-like material.

In an embodiment of the switching device, the lever arm is configured to be bended towards the contacting area by the movement of the contact bridge in case of a short circuit.

In an embodiment, the switching device comprises a housing. The contacting area is connected to/or is part of the housing. The lever arm is attached to the contact bridge carrier. The housing is a (fixed) switch housing.

In an embodiment of the switching device, the contact bridge is configured to perform a linear movement in case of a short circuit, at a transition from a switched-off state to a switched-on state of the switching device, and at a transition from the switched-on state to the switched-off state of the switching device.

In an embodiment, the switching device comprises a first terminal contact at which the first fixed contact is attached and a second terminal contact at which the second fixed contact is attached. The first and the second terminal contact are both bended in a U-form or U-shape.

In an embodiment of the switching device, the contacting area is connected to the contact bridge carrier. The lever arm is attached to the contact bridge.

In an embodiment of the switching device, the contact bridge is configured to perform a rotational movement in case of a short circuit and to perform a linear movement at a transition from a switched-off state to a switched-on state of the switching device, and at a transition from a switched-on state to a switched-off state of the switching device.

In an embodiment of the switching device, the contact bridge is configured in a C-form, U-form, C-shape or U-shape and includes a first leg end, a second leg end and an intermediate section. The first movable contact is attached to the first leg end. The second movable contact is attached to the second leg end. The intermediate section connects the first leg end to the second leg end.

There is provided a method of operating of a switching device. The switching device comprises a first and a second fixed contact, a contact bridge, a first and a second movable contact arranged at the contact bridge, at least one contact spring, a contact bridge carrier which is movable and is coupled to the contact bridge via the at least one contact spring and a lever arm connected to the contact bridge or the contact bridge carrier. The method comprises slowing down a movement of the contact bridge relative to the contact bridge carrier in case of a short circuit by the lever arm.

Advantageously, the switching device realizes a mechanical system to minimize contact rebound in a short circuit switching device. The DC switching device obtains an improved short circuit switching behavior due to mechanical rebound brake. The brake is realized by the lever arm.

The method for operating a switching device may be implemented, e.g., by the switching device according to one of the embodiments defined above.

In an example, within short circuit switching of a protective switching device, strong dynamic forces act on the contact system due to the high currents. The resulting strong opening impulse can lead to rebound and re-contacting of the system. The mechanical system to minimize contact rebound in short circuit switching devices uses friction to decrease energy and thus prevents the contact system from re-contacting. Reclosing of the contacts can result in different problems: Due to the reclosing the device does not achieve galvanic isolation. Reclosing of the contacts can lead to recurring contact bouncing, as the short circuit current can flow again when contacts are closed, this leads to repeating the initial problem. Due to the reclosing the extinguishing time and the stress in the switching device increases enormously. In addition, the still stationary electric arcs of very high energy can melt the contact surfaces so that permanent welding of the contacts can occur during re-contacting. The rebound brake uses the dynamic force of a short circuit case which act on the contact system. These forces ensure a dynamic movement of the contact system, which is transmitted on to a plastic wall via a lever arm. A friction force now arises between the lever arm and the plastic wall, which reduces the kinetic energy in the system. The resulting frictional force can be increased, e.g., by attaching ribs, teeth or grooves to the plastic wall.

In an example, unwanted re-contacting in case of a short circuit is prevented by the contact bridge—which is torn open by the short circuit current forces while the switching drive is still closed—resulting in slowing down the dynamic contact bridge opening, which significantly reduces the rebound impulse. The switching device realizes an effective mechanical rebound damping device for a short circuit-proof DC compact switch; unintentional reconnection in case of a short circuit can be avoided by the mechanical rebound damping device.

In an example, the switching device is implemented as an electromechanical switching device for conducting and switching bidirectional DC currents, especially for high-power battery networks in the field of electro-mobility.

The switching device may be part of an electric vehicle and/or hybrid vehicle. The switching device may be realized as a contactor or circuit breaker, switching in air or as a gas-tight sealed switching device.

BRIEF DESCRIPTION OF THE DRAWINGS

The following description of figures of embodiments may further illustrate and explain aspects of the switching device. Parts and devices with the same structure and the same effect, respectively, appear with equivalent reference symbols. In so far as parts or devices correspond to one another in terms of their function in different figures, the description thereof is not repeated for each of the following figures.

DETAILED DESCRIPTION

Figure 1A:
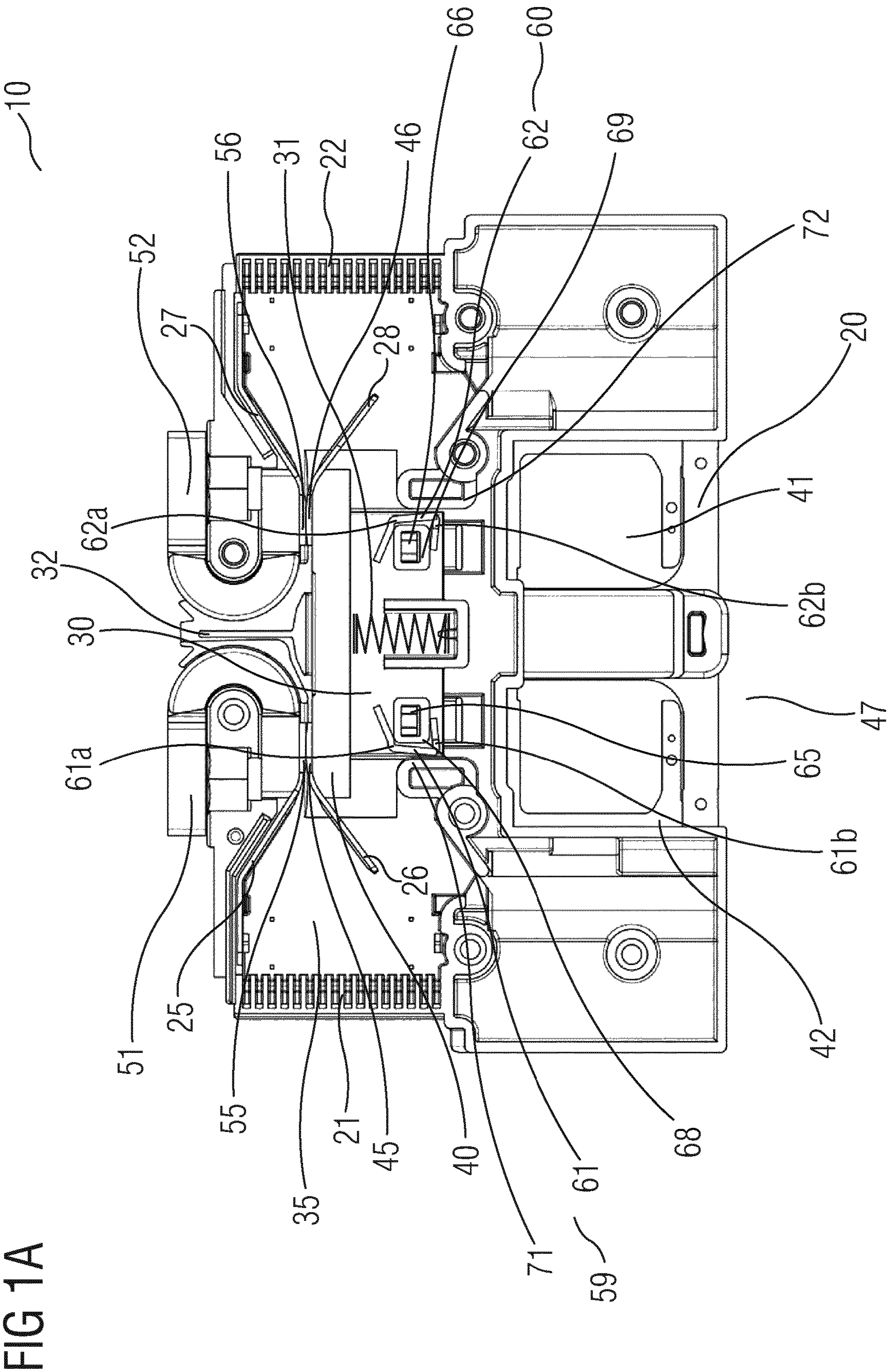
FIGS. 1A to 1C show an example of a switching device.

FIG. 1A shows an example of a switching device 10. The switching device 10 comprises a first movable contact 45, a second movable contact 46, a first fixed contact 55, a second fixed contact 56 and a contact bridge 40. The contact bridge 40 is realized as a cuboid. The contact bridge 40 may be made of copper. The contact bridge 40 may be called switching bridge or switching contact bridge. The first and the second movable contact 45, 46 are fixed on the contact bridge 40. The switching device 10 includes a first terminal contact 51 and a second terminal contact 52. The first fixed contact 55 is fixed on the first terminal contact 51. The second fixed contact 56 is fixed on the second terminal contact 52.

The first and the second terminal contact 51, 52 have a bended form. The first and the second terminal contact 51, 52 have a U-form. The first and the second terminal contact 51, 52 can be made of copper.

The switching device 10 comprises a contact bridge carrier 30. The contact bridge carrier 30 may be of plastics. The material of the contact bridge carrier 30 can have high dimensional and temperature stability as well as electrical resistance against currents at its surface. The contact bridge 40 is inserted into the contact bridge carrier 30. Moreover, the contact bridge carrier 30 comprises a barrier 32 that is arranged in the space between the first and the second terminal contact 51, 52. The barrier 32 is free of contact to the first and to the second terminal contact 51, 52. The barrier 32 has the form of a plate. The barrier 32 is also realized from a plastics material. The contact bridge carrier 30 and the barrier 32 are advantageously fabricated as one part.

Moreover, the switching device 10 comprises a magnetic drive assembly 47. The magnetic drive assembly 47 comprises an electric coil 41. Moreover, the magnetic drive assembly 47 comprises a magnet core 42 which holds the electric coil 41. Additionally, the magnetic drive assembly 47 comprises an armature 20. The switching device 10 comprises a contact spring 31 that can be named contact pressure spring. The contact spring 31 couples the contact bridge 40 to the contact bridge carrier 30. The armature 20 is fastened to the contact bridge carrier 30. The armature 20 is coupled via the contact bridge carrier 30 and the contact spring 31 to the contact bridge 40. The contact spring 31 may be made of steel such as inox steel. The contact spring 31 presses the contact bridge 40 in the direction of the first and second terminal contact 51, 52. The contact spring 31 fixes the contact bridge 40 in its target position. The contact spring 31 ensures the appropriate contact force when the switching device 10 is in the switched-on state.

Figure 1B:
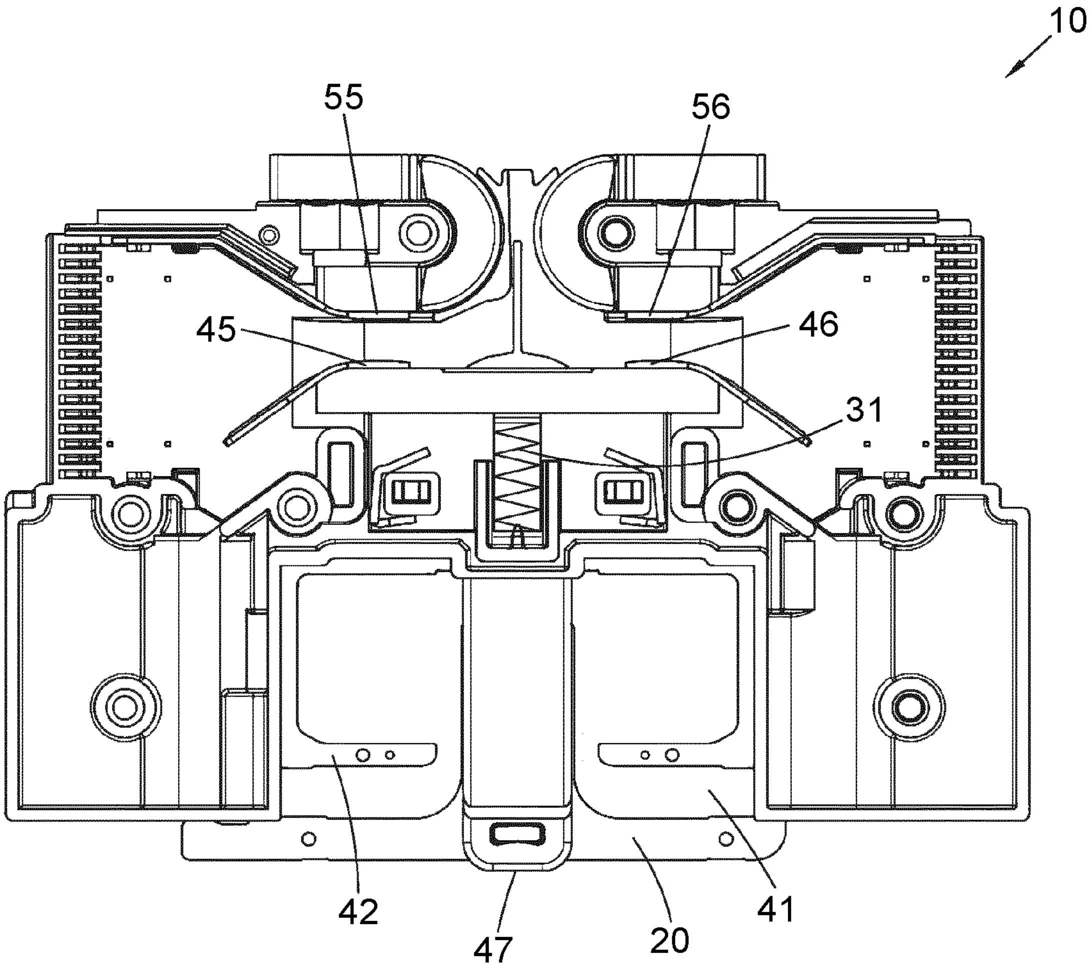
Figure 1C:
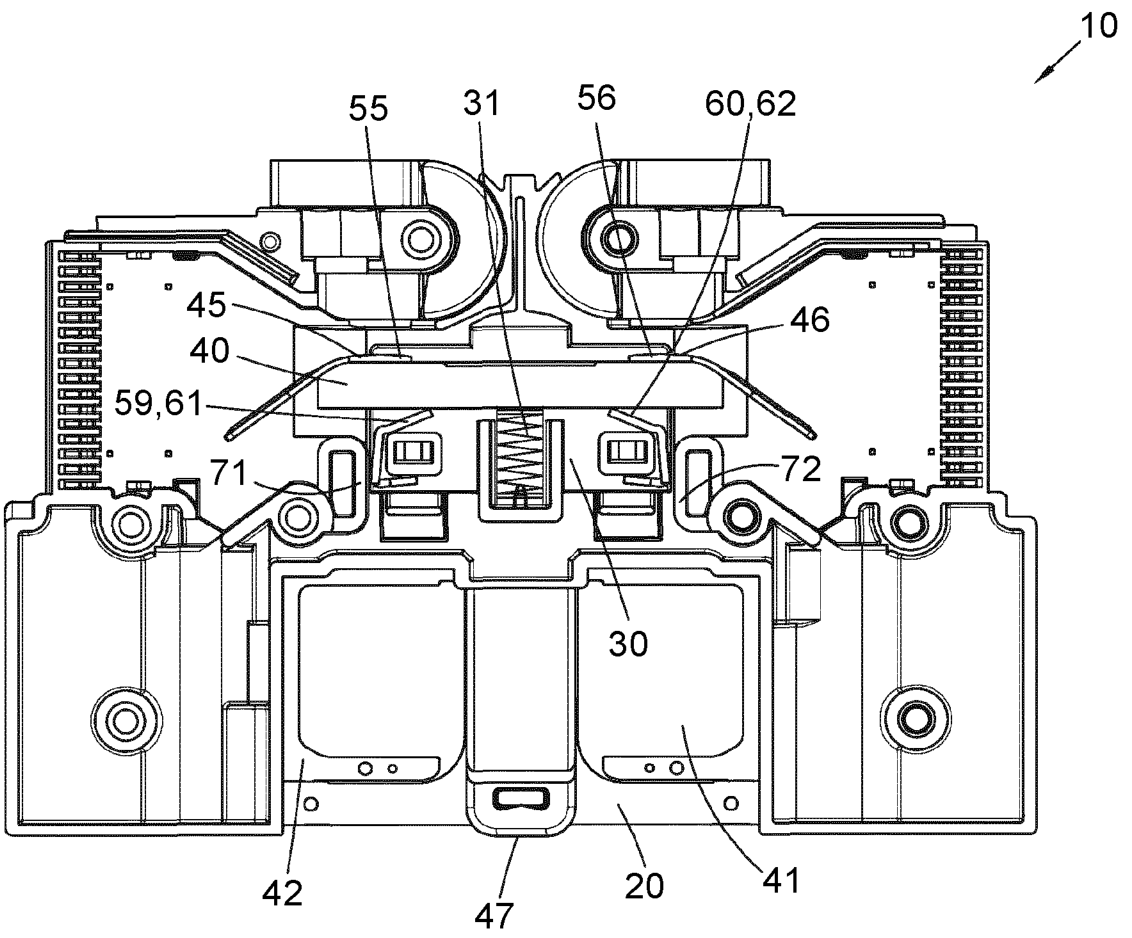

In FIGS. 1A-1C, the operation of the switching device 10 is shown. The switching device 10 is configured as a bidirectional DC compact switch with a mechanical rebound brake. FIG. 1A shows the switching device 10 in the switched-on state. Here, the contacting of the pole faces of the armature 20 and magnetic core 42 of the magnetic drive assembly 47 (also named electromechanical switching drive), together with the contact spring 31, causes the closing of the contact bridge 40 and the contacting of the two movable contacts 45, 46 with the two fixed contacts 55, 56 arranged above them and located on the contact terminals 51, 52, with a contact force required for the permanent conduction of the rated current.

The switching device 10 comprises at least a lever arm, e.g., a first and a second lever arm 59, 60. The first and the second lever arm 59, 60 are realized by a first and a second bracket 61, 62. The first and the second bracket 61, 62 are realized as metal brackets. The first and the second bracket 61, 62 are implemented as largely rigid rotatable metal brackets. The contact bridge carrier 30 includes a first and a second guide pin 65, 66. The first bracket 61 is arranged below the contact bridge 40 in such a way that its inner side contacts the first guide pin 65 at two points. Similarly, the second bracket 62 is arranged below the contact bridge 40 in such a way that its inner side contacts the second guide pin 66 at two points.

The first and the second guide pin 65, 66 projects out of the movable contact bridge carrier 30 carrying the contact bridge 40. The first and the second guide pin 65, 66 are integrally connected to the contact bridge carrier 30. In this case, the guide pins 65, 66 can be made of the same thermoplastic or thermosetting material as the movable contact bridge carrier 30. However, in order to increase the mechanical strength, the guide pins 65, 66 may also be reinforced at the surface with a metal sleeve 68, 69.

In an example, the first and the second bracket 61, 62 are each in the form of a double-bent lever fitted on the first and the second guide pin 65, 66. The inner surfaces of the first and the second bracket 61, 62 rest on the upper outer edge of the first and the second guide pin 65, 66 at the upper bending points 61*a*, 62*a*.

Furthermore, the switching device 10 comprises a first arc runner 25 connected to the first terminal contact 51. Moreover, the switching device 10 comprises a second arc runner 26 connected to the contact bridge 40 in vicinity of the first movable contact 45. Additionally, the switching device 10 comprises a third arc runner 27 connected to the second terminal contact 52. Moreover, the switching device 10 comprises a fourth arc runner 28 connected to the contact bridge 40 in vicinity of the second movable contact 46.

A first arcing chamber 21 of the switching device 10 is connected to the first arc runner 25. A second arcing chamber 22 of the switching device 10 is connected to the third arc runner 27. The first and the second arcing chamber 21, 22 comprise a number of splitter plates (not shown). Moreover, the switching device 10 comprises a permanent magnet system (not shown) having a permanent magnet and a first and a second pole plate. The contact bridge 40, the first and the second terminal contact 51, 52 and the first and the second arcing chamber 21, 22 are arranged between the first and the second pole plates.

The switching device 10 is configured to be set in a switched-on state or a switched-off state. The switched-on state is shown in FIG. 1A. The switching device 10 is set from the switched-off state into the switched-on state by a movement of the contact bridge 40 in a direction perpendicular to the contact bridge 40. The contact bridge 40 has a first and a second main surface. The movable contacts 45, 46 are located at the first main surface of the contact bridge 40. The movement is perpendicular to at least one of a centerline of the contact bridge 40, a longitudinal axis of the contact bridge 40 or the first main surface of the contact bridge 40. The magnetic drive assembly 47 moves the contact bridge 40 via the contact bridge carrier 30 and the contact spring 31 towards the first and the second terminal contact 51, 52. Thus, a load current I can flow from the first terminal contact 51 via the first fixed contact 55, the first movable contact 45, the contact bridge 40, the second movable contact 46 and the second fixed contact 56 to the second terminal contact 52.

FIG. 1B shows the example of the switching device 10 shown in FIG. 1A in the switched-off state. In the switched-off state, the first and the second fixed contact 55, 56 are not in contact with the first and the second movable contact 45, 46. Thus, a flow of a load current I from the first terminal contact 51 to the second terminal contact 52 via the contact bridge 40 is inhibited. The switching device 10 is set from the switched-on state into the switched-off state by a movement of the contact bridge 40 that separates the contact bridge 40 from the first and the second terminal contact 51, 52. In case of a load current I flowing before switching, a first arc may be generated between the first fixed contact 55 and the first movable contact 45 and a second arc may be generated between the second movable contact 46 and the second fixed contact 56.

At the transition between the switched-on state to the switched-off state, the armature 20 pulls the contact bridge carrier 30 and the contact bridge 40 away from the first and the second terminal contact 51, 52.

FIG. 1C shows the example of the switching device 10 shown in FIGS. 1A and 1B in case of a short circuit. The words “in case of a short circuit” could be replaced, e.g., by the words “in the event of a short circuit”.

The first and the second lever arm 59, 60 realized as the first and the second bracket 61, 62 operate as follows: If a force is applied to the upper end of the leg of the first bracket 61 facing the contact bridge 40, a rotational movement is induced via the lever function of the first bracket 61 in such a way that the force is deflected by 90° to the lower bending point 61*b*. This results in a grinding contact of the first bracket 61 with a contacting area 71 (that may be named contact area, contacting surface or stop surface) at the bending point. Similarly, if a force is applied to the upper end of the leg of the second bracket 62 facing the contact bridge 40, a rotational movement is induced via the lever function of the second bracket 62 in such a way that the force is deflected by 90° to the lower bending point 62*b*. This results in a grinding contact of the second bracket 62 with a further contacting area 72 at the bending point. The contacting areas 71, 72 are included by a housing 35 of the switching device 10. The housing 35 can include two pins or bars comprising the contacting areas 71, 72. Alternatively, the contacting areas 71, 72 are connected to the housing 35.

In an example, the contacting areas 71, 72 have a rough surface. Thus, the abrasive contacting can be associated with a frictional effect. In another example, the contacting areas 71, 72 are made of rubber or a rubber-like material or have a groove-like or ribbed structure on their surfaces.

In the switched-on state shown in FIG. 1A, there is no contact between the contact bridge 40 and the upper ends of the brackets 61, 62 and thus no force is applied to the contacting areas 71, 72. Similarly, there is no contact between the contact bridge 40 and the brackets 61, 62 during a regular disconnection, shown in FIG. 1B. In this state, the pole faces of the magnetic core 42 and the armature 20 are separated from each other, the fixed and movable contacts 45, 46, 55, 56 are open and the contact spring 31 is released.

In the short circuit case with a high short circuit current, on the other hand, a dynamic tearing open of the switching contacts occurs. In this case shown in FIG. 1C, the contact bridge 40 moves downwards while the solenoid drive and the armature 20 are still closed, with additional compression of the contact spring 31. This results in a contact between the contact bridge 40 and the two brackets 61, 62, combined with a force acting on the contacting areas 71, 72. The frictional movement associated with this removes kinetic energy from the dynamic contact opening process and thus mitigates the rebound effect of the contact bridge 40 at an early stage when the contact spring 31 is released in such a way that the movable contacts 45, 46 are not re-contacted to the fixed contacts 55, 56.

Figure 2A:
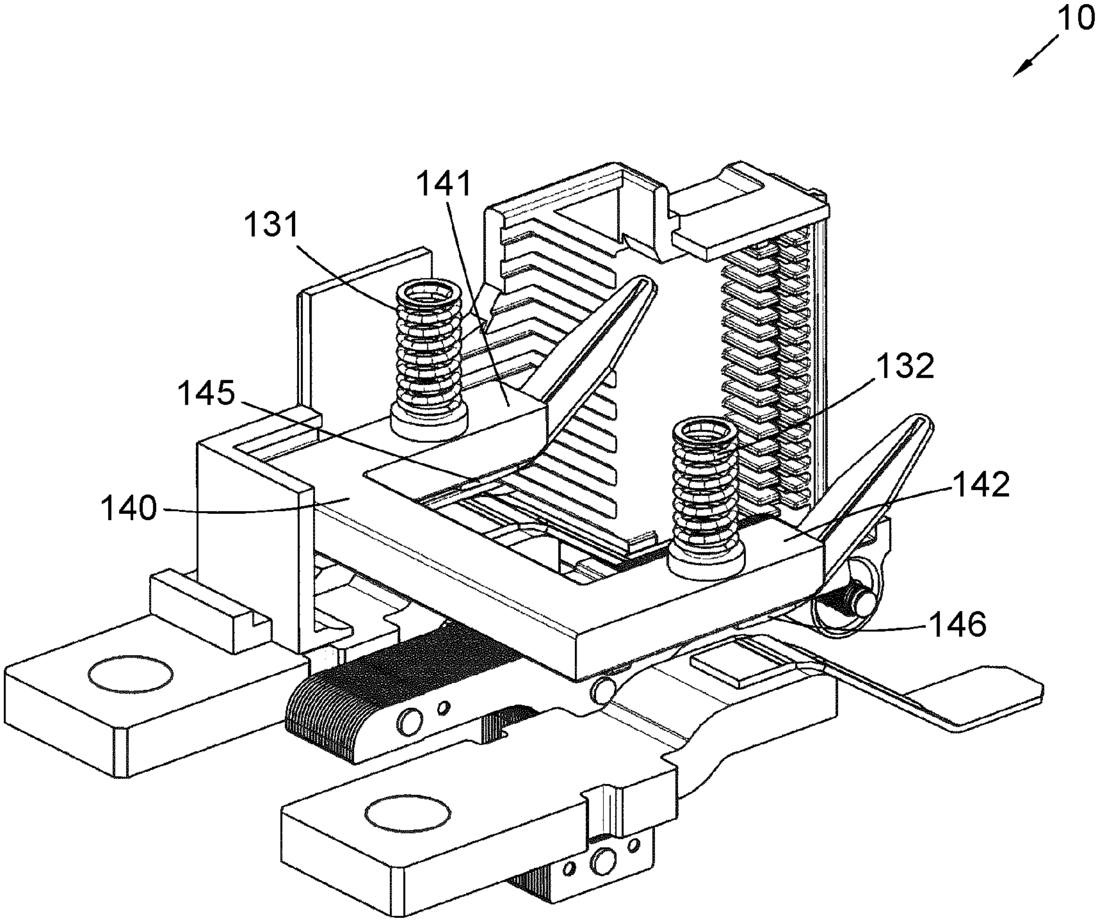
FIGS. 2A to 2E show further examples of a switching device.

FIG. 2A shows a further example of a switching device 10 which is a further development of the embodiment shown in FIGS. 1A to 1C. In FIGS. 2A to 2E, another embodiment of a mechanical rebound brake for the short circuit case is presented on a switching device 10 with a different geometry of the contact bridge 140. Unlike the switching device 10 with a cuboid bridge contact shown in FIGS. 1A-1C, this switching device 10 has a C-shaped contact bridge geometry (FIG. 2A). The contact bridge 140 has a C-form or a U-form. The first and the second movable contact 145, 146 are located at a first and a second leg end 141, 142 of the contact bridge 140. An intermediate section of the contact bridge 140 connects the first leg end 141 to the second leg end 142. The switching device 10 comprises the contact spring 131 and a further contact spring 132. The contact springs 131, 132 are arranged above the movable contacts 145, 146. In case of a regular disconnection operation, the contact bridge 140 moves in a purely translatory manner in the direction of the movement of the armature 20 of the solenoid drive, as in case of the switching device 10 shown in FIGS. 1A-1C (which is equipped with a metal bracket brake).

Figure 2B:
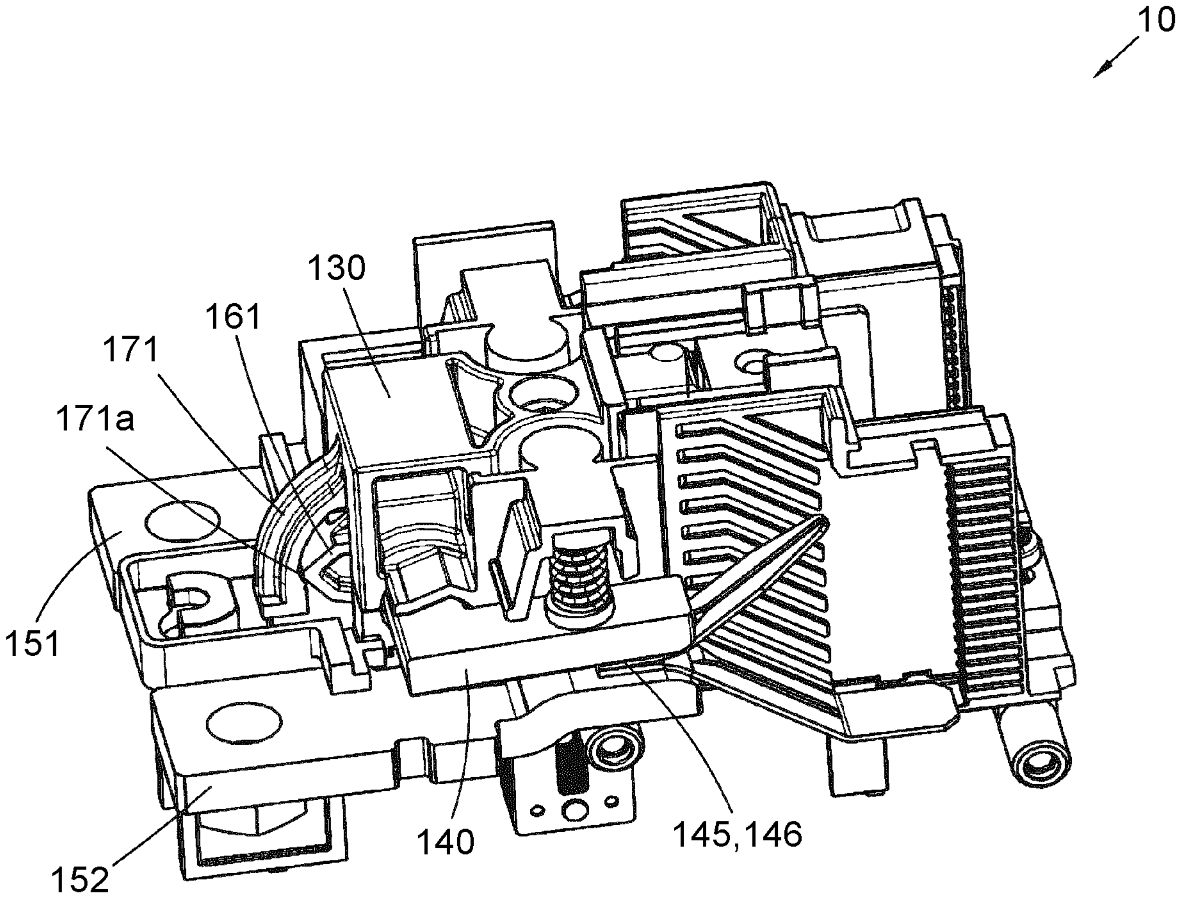
Figure 2C:
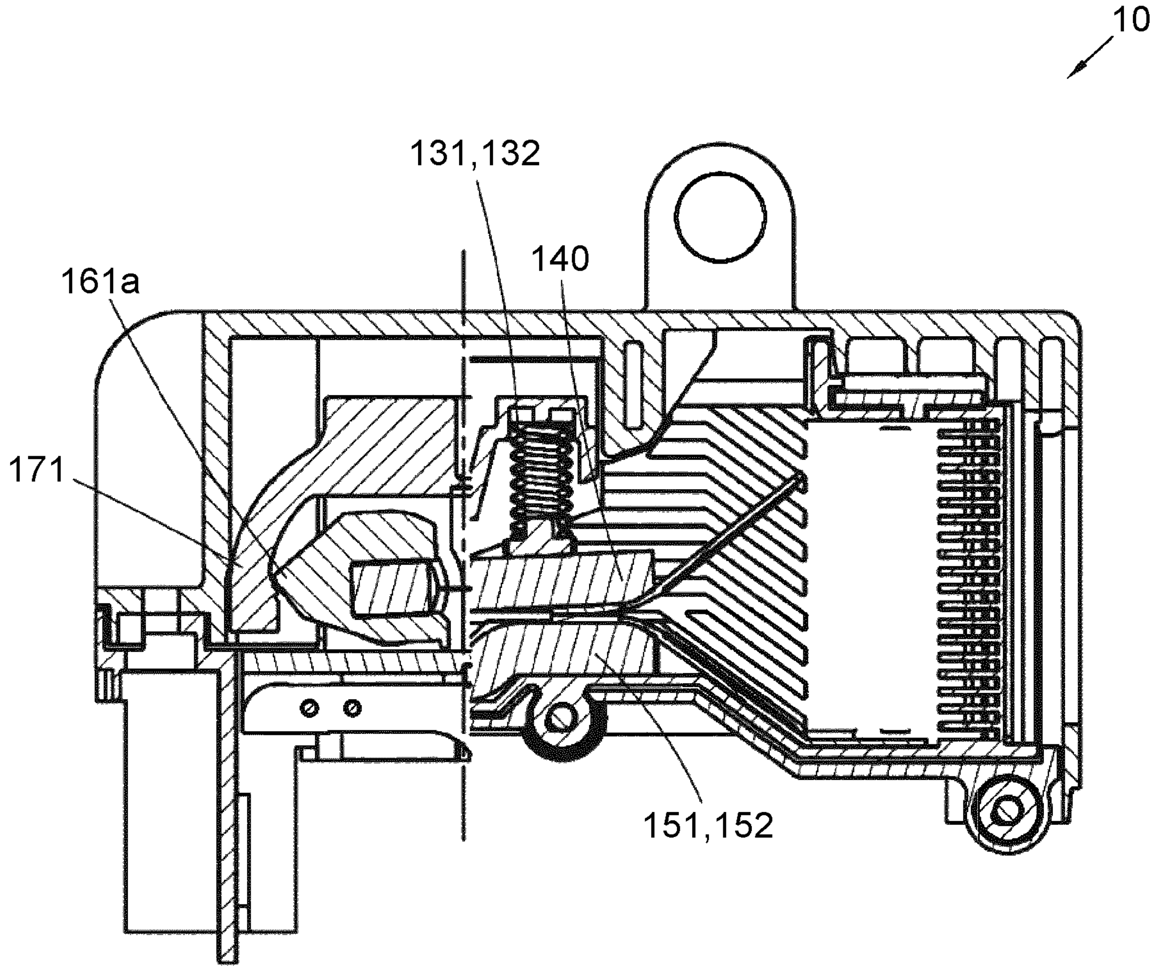
Figure 2D:
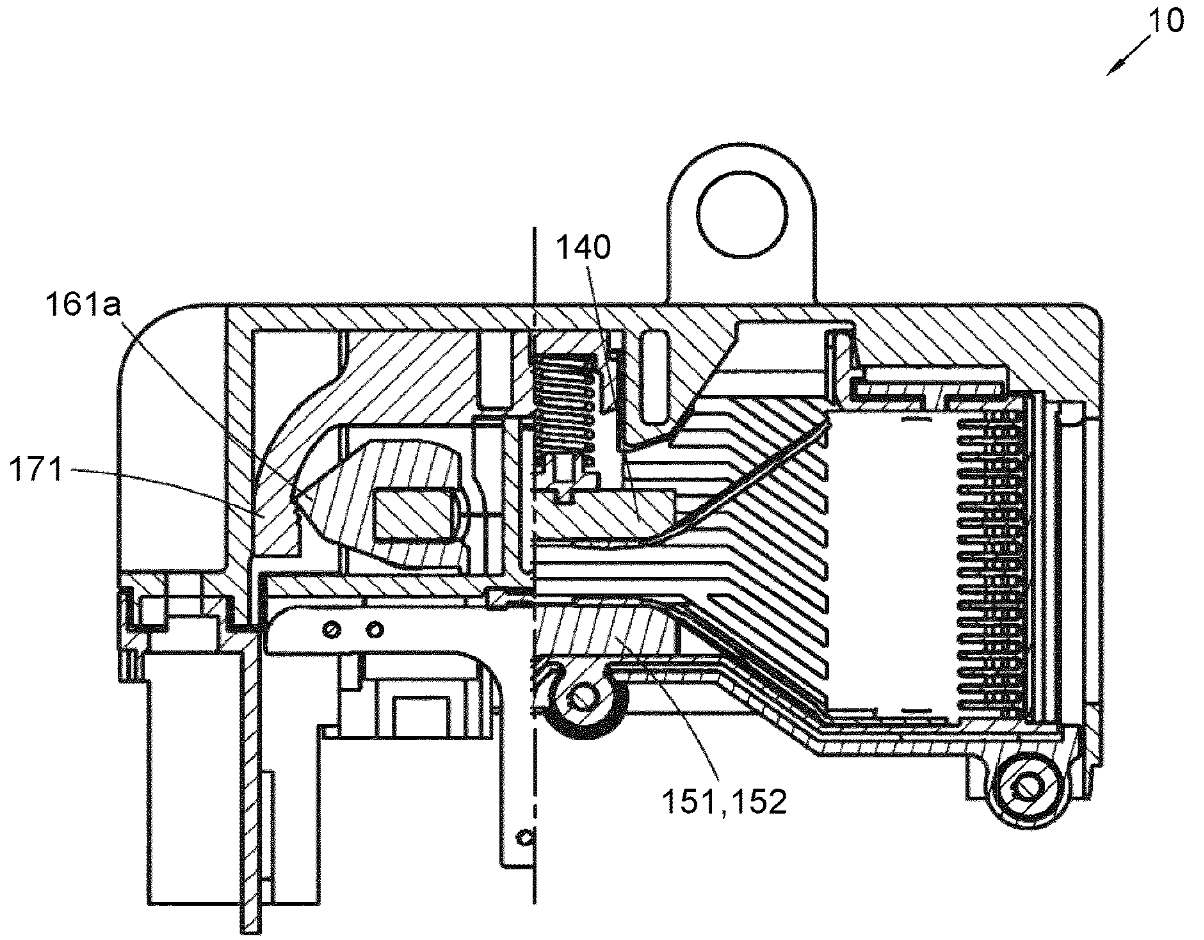
Figure 2E:
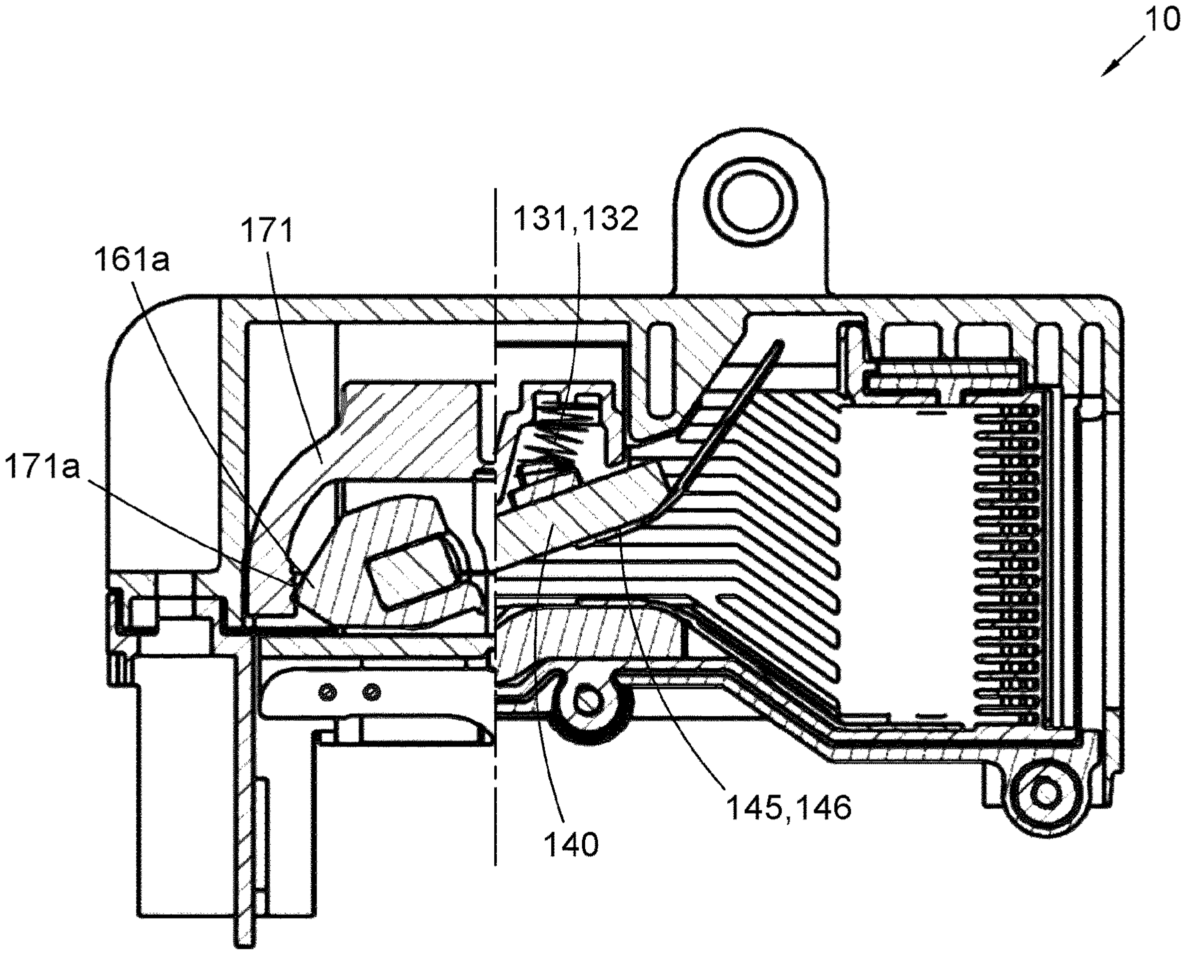

On the other hand, in case of a short circuit with a high short circuit current, the eccentric arrangement of the movable contacts 145, 146 causes a rotational dynamic contact opening (FIG. 2E). This rotational movement of the bridge contact 140 is correspondingly transmitted to an eccentric lever arm 161, which is directly connected to the contact bridge 140 and is arranged on the other side of the rotational axis of the contact bridge 140 with respect to the movable contacts 145, 146. The lever arm 161 functions as a brake finger. The lever arm 161 is fixed to the contact bridge 140. The lever arm 161 is attached to the intermediate section of the contact bridge 140. During its rotational movement during the dynamic opening process, a tip 161*a* of the lever arm 161 (the tip of the brake finger) performs a contacting movement along a contacting area 171*a*. The contact bridge carrier 130 comprises the contacting area 171*a*. The contacting area 171*a* is included by a plastic arch 171 or plastic sheet which is integrally connected to the contact bridge carrier 130 and can be preferentially made of the same thermoplastic or thermoset material as the contact bridge carrier 130. The contacting area 171*a* is bent.

In an example, the contacting area 171*a* is entirely or partially made of a friction-enhancing material, such as rubber or a rubber-like material. Advantageously, the lever arm 161 may comprise a thermoplastic or thermoset material. However, the lever arm 161 may also comprise a suitable other material, for example a metallic material or comprise a metallic tip. The contour of the plastic arch 171 is such that, during the rotational movement of the contact bridge 140 in case of a short circuit, there is permanent contact between the tip 161*a* of the lever arm 161 and the contacting area 171*a* of the plastic arch 171. This contacting can be implemented in such a way that the plastic arch 171 has an approximately circular contour in the contacting area 171*a*, which follows the rotational movement of the tip 161*a*. With only a small angle of rotation, only a small frictional force is generated by the contact of the tip 161*a* with the plastic arch 171. As the angle of rotation increases, the transmitted frictional force also increases. This can advantageously be done in such a way that as the angle of rotation increases, the radius of curvature of the surface contour becomes smaller than the radius of the circular motion described by the tip 161*a* of the lever arm 161.

In another embodiment, instead of having a radius of curvature that is dependent on the angle of rotation, the contacting area 171*a* can also have a surface structure that changes with the angle of rotation, such as corrugation or serrations in a contacting area 171*a* in the region of larger angles of rotation. The contacting area 171*a* can be a rough or toothed area.

As a result, the rotary movement of the contact bridge 140 induced by the dynamic current forces in case of a short circuit causes a frictional force which increases with increasing angle of rotation and which reduces the dynamic movement of the rotated contact bridge 140 in such a way that no re-contacting of the switching contacts occurs in the course of the immediately following (linear) opening movement of the switch drive with the relaxation of the two contact springs 131, 132.

The mode of operation of the rotary rebound brake is described for different switching states in FIGS. 2C-2E using the example of a circularly curved plastic part (realized by the plastic arch 171) with a partial groove structure that forms a part of the contacting area 171*a*.

FIGS. 2C to 2E show cross-sections of the switching device 10 of FIGS. 2A and 2B. The cross-sections are shown in different planes: On the left side of the dashed line, the cross-section shows the lever arm 161, whereas on the right side of the dashed line, the cross-section shows the leg end 142 (the leg end 141 is "behind" the leg end 142). Thus, the plane on the left side of the dashed line is "deeper" than the plane on the right side of the dashed line.

In FIG. 2C, the switched-on state with regular current flow is illustrated. In this case, the contact springs 131, 132 are slightly compressed compared to the switched-off state to apply the contact force required for a permanent current flow. In this case, the position of the contact bridge 140 is slightly rotated with respect to the position of the two terminal contacts 151, 152. Accordingly, the tip 161*a* also contacts the plastic arch 171 in a non-toothed area.

FIG. 2D shows the situation in the regularly disengaged state. The contact bridge 140 is exactly parallel to the two terminal contacts 151, 152, the tip 161*a* of the lever arm 161 also touches the non-toothed area of the plastic arch 171 almost without friction in this case.

FIG. 2E shows the situation in case of a short circuit. In case of a high short circuit current, the movable contacts 145, 146 are torn open by the dynamic current forces, combined with a rotation of the contact bridge 140. As a result of the rotational movement, the contact springs 131, 132 are compressed to a greater extent than in the regular switch-on case, as well as being slightly displaced in the transverse direction, and at the same time the tip 161*a* of the lever arm 161 penetrates more or less deeply into the toothed area of the contacting area 171*a* of the plastic arch 171, depending on the level of the short circuit current. The frictional energy expended for this purpose causes the braking of the movement of the contact bridge 140 required to prevent undesired re-contacting.

The embodiments shown in FIGS. 1A to 2E as stated represent examples of the improved switching device 10 and method; therefore, they do not constitute a complete list of all embodiments according to the improved switching device and method. Actual switching device and methods may vary from the embodiments shown in terms of parts, structures and shape, for example.

The invention claimed is:

1. A switching device, comprising:

a first and a second fixed contact;

a contact bridge;

a first and a second movable contact arranged at the contact bridge;

at least one contact spring;

a contact bridge carrier which is movable; and a first and a second terminal contact, wherein the first fixed contact is fixed on the first terminal contact and the second fixed contact is fixed on the second terminal contact, wherein the switching device is configured that a load current flows from the first terminal contact via the first fixed contact, the first movable contact, the contact bridge, the second movable contact and the second fixed contact to the second terminal contact, wherein the contact bridge carrier is coupled to the contact bridge via the at least one contact spring, wherein the switching device further comprises a lever arm connected to the contact bridge or the contact bridge carrier and configured to slow down a movement of the contact bridge relative to the contact bridge carrier in case of a short circuit such that a mechanical rebound brake is realized by the lever arm, wherein the switching device further comprises a magnetic drive assembly comprising an electric coil and an armature, wherein the armature is movable and is coupled to the contact bridge carrier, and wherein the switching device is configured such that dynamic forces of a short circuit current cause the switching contacts to open even before a first and second movable actuator starts a mechanical opening process via a de-current signal induced by a current sensor.

2. The switching device according to claim 1, wherein the switching device is configured such that a current flowing in case of a short circuit through the first fixed contact, the first movable contact, the contact bridge, the second movable contact and the second fixed contact causes the movement of the contact bridge relative to the contact bridge carrier in case of a short circuit.

3. The switching device according to claim 1,
wherein the lever arm is configured to be bent towards a contacting area in case of a short circuit such that a frictional force occurs between a tip of the lever arm and the contacting area.

4. The switching device according to claim 3,
wherein the contacting area has at least one of:
a rough surface,
a toothed structure,
a groove,
a ribbed structure, and
a surface made of rubber.

5. The switching device according to claim 3, wherein the lever arm is configured to be bent towards the contacting area by the movement of the contact bridge in case of a short circuit.

6. The switching device according to claim 3, wherein the switching device comprises a housing,
wherein the contacting area is connected to the housing or is part of the housing, and
wherein the lever arm is attached to the contact bridge carrier.

7. The switching device according to claim 6, wherein the contact bridge is configured to perform a linear movement:
in case of a short circuit,
at a transition from a switched-off state to a switched-on state of the switching device, and
at a transition from the switched-on state to the switched-off state of the switching device.

8. The switching device according to claim 7, wherein the first and the second terminal contact are both bent in a U-form or U-shape.

9. The switching device according to claim 3, wherein the contacting area is connected to the contact bridge carrier, and
wherein the lever arm is attached to the contact bridge.

10. The switching device according to claim 9, wherein the contact bridge is configured to perform a rotational movement in case of a short circuit and to perform a linear movement
at a transition from a switched-off state to a switched-on state of the switching device, and
at a transition from a switched-on state to a switched-off state of the switching device.

11. The switching device according to claim 9, wherein the contact bridge is configured in a C-form or U-form and includes a first leg end, a second leg end and an intermediate section,
wherein the first movable contact is attached to the first leg end,
wherein the second movable contact is attached to the second leg end, and
wherein the intermediate section connects the first leg end to the second leg end.

12. A method for operating a switching device, wherein the switching device comprises a first and a second terminal contact, a first fixed contact fixed on the first terminal contact, a second fixed contact fixed on the second terminal contact, a contact bridge, a first and a second movable contact arranged at the contact bridge, at least one contact spring, a contact bridge carrier which is movable and is coupled to the contact bridge via the at least one contact spring, a lever arm connected to the contact bridge or the contact bridge carrier, and a magnetic drive assembly with an electric coil and an armature, wherein the armature is movable and is coupled to the contact bridge carrier, and wherein the method comprises:
flowing of a load current from the first terminal contact via the first fixed contact, the first movable contact, the contact bridge, the second movable contact and the second fixed contact to the second terminal contact,
opening the first and second movable contacts by dynamic forces of a current of a short circuit even before a switching actuator starts a mechanical opening process via a de-current signal induced by a current sensor, and
slowing down a movement of the contact bridge relative to the contact bridge carrier in case of the short circuit by the lever arm such that a mechanical rebound brake is realized by the lever arm.

13. A switching device, comprising:
a first and a second fixed contact;
a contact bridge;
a first and a second movable contact arranged at the contact bridge;
at least one contact spring;
a contact bridge carrier which is movable; and
a first and a second terminal contact,
wherein the first fixed contact is fixed on the first terminal contact and the second fixed contact is fixed on the second terminal contact,
wherein the switching device is configured such that a load current flows from the first terminal contact via the first fixed contact, the first movable contact, the contact bridge, the second movable contact and the second fixed contact to the second terminal contact,
wherein the contact bridge carrier is coupled to the contact bridge via the at least one contact spring,
wherein the switching device further comprises a lever arm attached to the contact bridge and configured to slow down a movement of the contact bridge relative to the contact bridge carrier in case of a short circuit such that a mechanical rebound brake is realized by the lever arm,
wherein the lever arm is configured to be bent towards a contacting area in case of a short circuit such that a frictional force occurs between a tip of the lever arm and the contacting area,
wherein the contacting area is connected to the contact bridge carrier, and
wherein the contact bridge is configured to perform a rotational movement in case of a short circuit and to perform a linear movement:
at a transition from a switched-off state to a switched-on state of the switching device, and
at a transition from a switched-on state to a switched-off state of the switching device.

* * * * *